2 Sheets—Sheet 1.
J. C. BARLOW.
Seed-Planter.
No. 220,268. Patented Oct. 7, 1879.
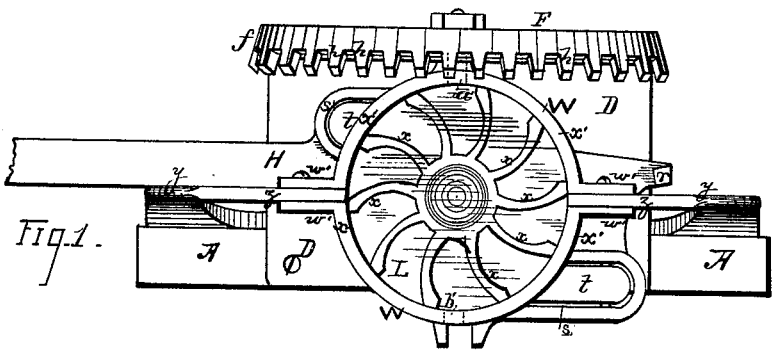
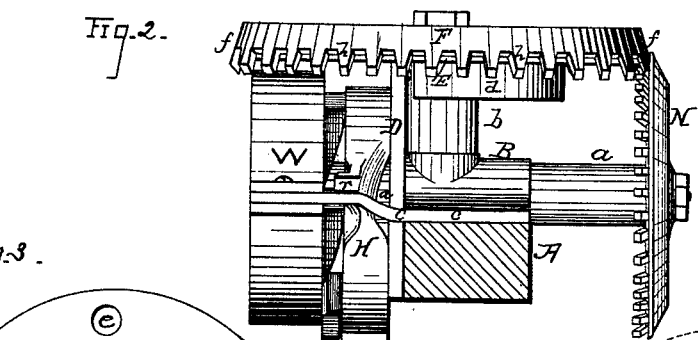
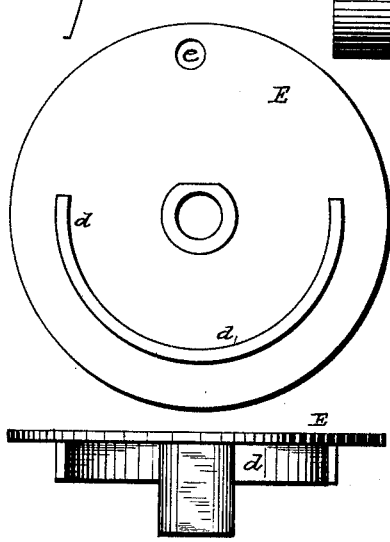
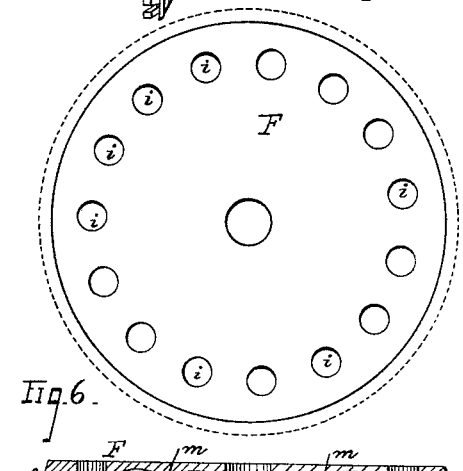
WITNESSES —
INVENTOR =
Joseph C. Barlow
By his Attys,
Cox and Cox J. C. BARLOW.
Seed-Planter.
No. 220,268.  Patented Oct. 7, 1879.
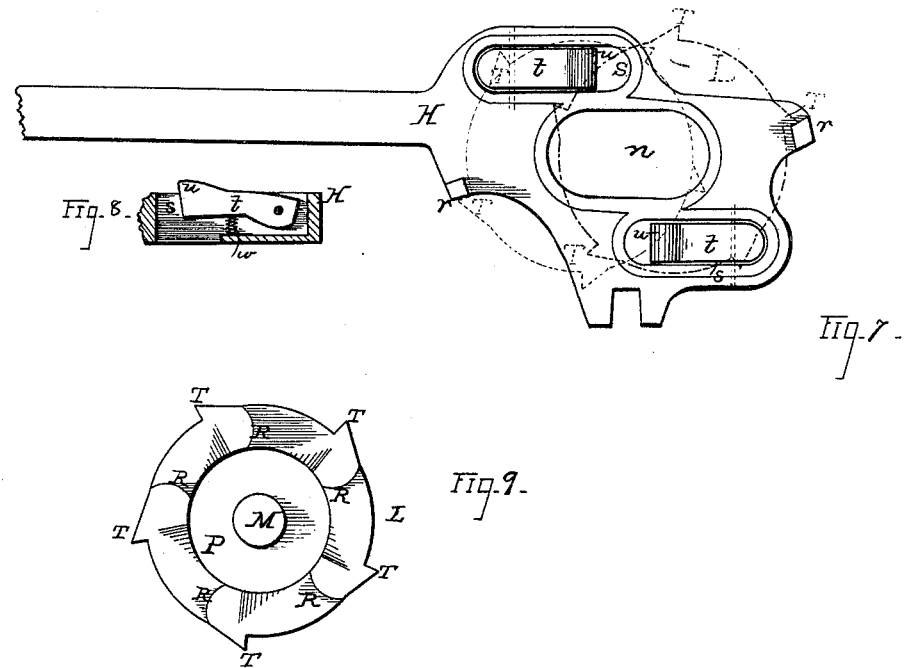

UNITED STATES PATENT OFFICE.

JOSEPH C. BARLOW, OF QUINCY, ILLINOIS.

IMPROVEMENT IN SEED-PLANTERS.

Specification forming part of Letters Patent No. 220,268, dated October 7, 1879; application filed August 28, 1879.

*To all whom it may concern:*

Be it known that I, JOSEPH C. BARLOW, of Quincy, in the county of Adams and State of Illinois, have invented a new and useful Improvement in Seed-Planters, of which the following is a specification, reference being had to the accompanying drawings.

The invention relates to an improvement in seed-planters, and consists of a rotary seed-cup of novel construction and an effectual means for operating the same, all as hereinafter set forth.

The object of the invention is to supply a suitable mechanism whereby the seed in given quantities are conveyed at regular intervals from the hopper to the tube, through which they fall to the ground.

In the accompanying drawings, Figure 1 is a detached plan view of a seeding mechanism containing an incorporation of the elements of the invention. Fig. 2 is an end view of same. Fig. 3 is a bottom view of the plate E, and Fig. 4 is a side view of same. Fig. 5 is a top view of the plate F, and Fig. 6 is a central vertical section of same. Fig. 7 is a detached plan view of the connecting-iron, the dotted lines showing the position of the wheel L at the end of each stroke of the iron. Fig. 8 is a view of one of the spring-actuated pawls. Fig. 9 is a detached plan view of the plate P.

In the accompanying drawings, A represents a portion of the frame of a seed-planter, upon which is suitably mounted one or more journal-boxes, B, which, in detail, consist of the elongated horizontal bearing $a$, the vertical shaft $b$, and the parts $c$, for securing the boxes to the frame A by bolts, screws, or other convenient means. Upon the frame A is also fastened the lower portion of the plate D, the upper portion whereof extends upward immediately in front of the shaft $b$, and encircles that portion of the bearing $a$ in front of the said shaft. The purpose of the plate D is principally to prevent the plate E from revolving, and to serve as a backing for the connecting-rod with its spring-pawls, as hereinafter set forth. The plate E is in the form of a disk, and has at its center an elongated vertical bearing, which fits over the shaft $b$ and rests upon the base thereof. Upon the under side of the stationary plate E, arranged coincidently with its circumference, and a proper distance therefrom, is the vertical flange $d$, in the form of a half-circle, and upon the side of the plate opposite to this flange is an aperture, $e$, hereinafter mentioned. When the stationary plate E is in position on the shaft $b$, the aperture $e$ is nearest the front of the machine, while the two ends of the circular flange $d$ come in close contact with the upper edge of the plate D, and thus hold the disk or plate E stationary.

Above the stationary plate E, and resting upon its upper surface, is also mounted upon the shaft $b$ the circular drop-plate F, having the downwardly-deflecting circumferential flange $f$, carrying the cog-teeth $h$. The drop-plate F is supplied, adjacent to its periphery, with the apertures $i$, arranged in a circle completely around the plate, and in such position that when the plate is revolved the apertures will successively come directly over the aperture $e$, forming thus at regular intervals a clear passage through the two apertures. The under surface of the drop-plate F is grooved so as to form a flange or ring, $m$, which rests upon the plate E, and serves to support the plate F. The plate F is designed to form the base of the seed-hopper. (Not shown.)

The portion of the bearing $a$ which extends in front of the shaft $b$ enters the slot $n$ formed in the end of the connecting-iron H, and prevents it from moving vertically at all and horizontally for no greater distance than the length of the slot. Thus the connecting-iron is held in proper position, but at the same time is allowed sufficient movement to fully accomplish its object. The connecting-iron is secured in the machine in a vertical position, being arranged with one of its edges downward, while its faces are free to operate upon the adjacent devices, and by means of its slot $n$, moving on the bearing $a$ or equivalent device, a perfect stop, controlling the movement of the connecting-iron, is formed, as above set forth. Upon the lower inner and the upper outer portions of the end of the connecting-iron are the lugs $r$, hereinafter mentioned; and upon the two opposite portions of the end of the connecting-iron—viz., the upper inner and the lower outer—are the pockets $s$, in which are pivoted the pawls $t$, having heads $u$, and provided with springs $w$ to retain them in proper position.

The seed-cup wheel L is secured in close relation to the face of the vertical end of the connecting-iron H on the axle M, which passes rearward through the elongated bearing $a$, and has keyed upon its rear end the pinion N, the teeth of which mesh with the teeth of the drop-plate F, and which, when revolved, communicate motion to the latter plate.

The seed-cup wheel L is in the form of a disk, and has a number of buckets formed upon its face by the arms $x$, which radiate from its center, as shown at Fig. 1.

Upon the rear of the seed-cup plate L is rigidly fastened the plate P, having upon its face, adjacent to its edges, a series of ratchets, R, and upon its periphery a series of lugs, T, corresponding in number and position with the ratchets R, the purposes of both of which will appear hereinafter.

About the seed-cup plate or wheel L is secured a casing, W, having a transparent face, an aperture, $a'$, at its upper portion, immediately below the aperture $e$, and an aperture, $b'$, at its lower portion, leading into the seed-tube, (not shown,) which conducts the seed to the ground.

The casing W is composed of two semicircular sections, $x'$, which snugly encompass the seed-cup plate L, and which have at their ends the lugs $w'$, whereby they are secured upon the opposite sides of the horizontal arm or arms $z$ of the casting $y$, as shown, by means of screws or otherwise.

When the connecting-iron is drawn to the left as far as the length of the slot $n$, it will then be in a proper position to be operated, and when in this position the head of the upper pawl, $t$, will be in contact with one of the upper ratchets, R. Thus when the connecting-iron is pushed to the right the said upper pawl will, by pressing against the ratchet, cause the seed-cup to revolve a definite distance, just enough to bring one of the buckets of the seed-cup directly below the aperture $e$ and one of the apertures $i$ immediately above the said aperture $e$, thus allowing a clear passage for a charge of grain from the hopper to the said bucket. The restricted movement of the seed-cup is communicated, through the axle M and pinion N, to the seed-plates F. Thus all the moving parts of the planter operate simultaneously and in the same degree.

When the connecting-rod is pushed to the right, as aforesaid, the upper pawl engages the ratchet, while the lower pawl slips over the lower ratchet. When the connecting-rod H is drawn inward again the lower pawl engages the ratchet and operates the mechanism, while the upper pawl is idle. Each half-throw of the connecting-iron operates the mechanism sufficiently to open the passage from the seed-hopper and bring the next bucket on the seed-cup in position to receive the charge. This movement of the connecting-rod is kept up as long as may be desired, at the end of each half-throw a new charge of seed being received by the seed-cup, and at the same time a charge delivered to the seed-tube, (not shown,) which conveys it to the ground.

The lugs $r$ are to prevent the seed-cup wheel L from turning too far by coming in contact with the lugs T at each half-throw of the connecting-iron, being only released therefrom by the next movement of the said iron.

While the connecting-iron H is being moved either to the right or left the plate D serves as a backing for it, and to keep the spring-pawls $t$ in contact with the ratchet-plate P.

What I claim as my invention, and desire to secure by Letters Patent, is—

1. In a seed-planter, the connecting-iron H, operating in an upright position, and provided with spring-pawls, in combination with the vertical seed-cup wheel L, carrying ratchets, bearing $a$, and a dropping-plate, F, substantially as set forth.

2. The connecting-iron H, having pawls $t$, in combination with the vertical seed-cup wheel L, ratchets R, axle M, pinion N, and plates E F, substantially as set forth.

3. The stationary plate E, having the flange $d$, in combination with the plate D, substantially as specified.

4. The connecting-iron H, having the slot $n$, in combination with the bearing $a$, whereby a stop is formed to prevent the vertical and control the horizontal movement of the said iron, substantially as set forth.

In testimony that I claim the foregoing improvement in seed-planters, as above described, I have hereunto set my hand this 23d day of August, 1879.

JOSEPH C. BARLOW.

Witnesses:
LEWIS B. BOSWELL,
EDWARD O. WILD.